C. H. SMITH.
COUCH ROLL FOR PAPER MAKING MACHINES.
APPLICATION FILED MAY 10, 1909.
954,055.
Patented Apr. 5, 1910.
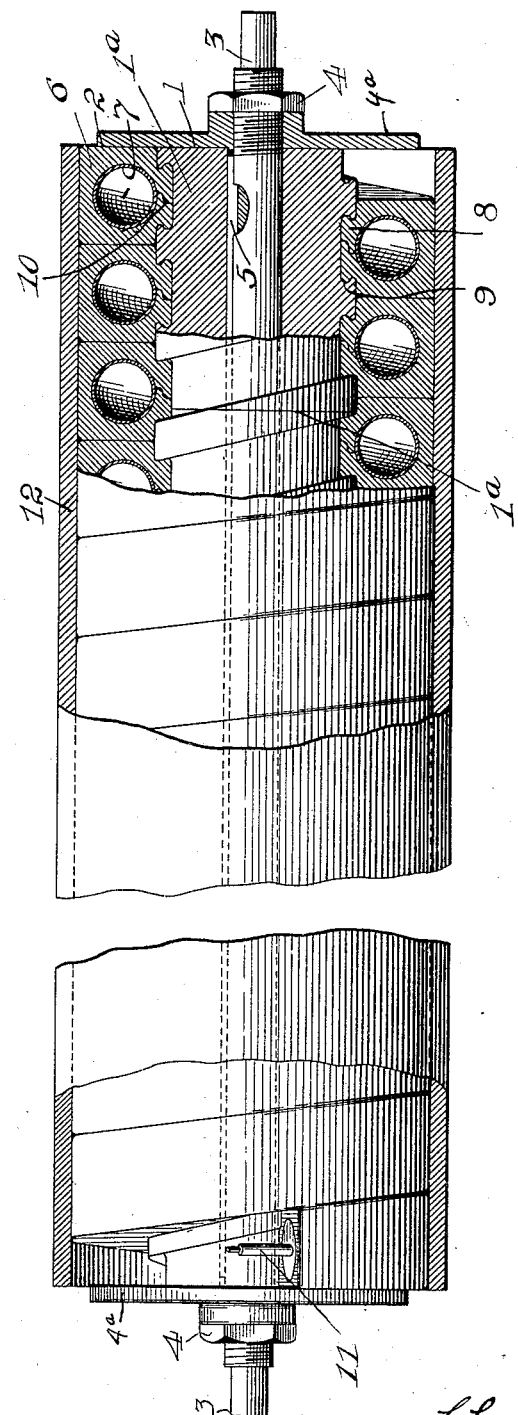
Witnesses:
J. C. Devick.
George L. Chindahl
Inventor:
Charles H. Smith
By Luther L. Miller
Attorney.

UNITED STATES PATENT OFFICE.

CHARLES H. SMITH, OF MARSEILLES, ILLINOIS.

COUCH-ROLL FOR PAPER-MAKING MACHINES.

954,055.      Specification of Letters Patent.      Patented Apr. 5, 1910.

Application filed May 10, 1909. Serial No. 495,072.

*To all whom it may concern:*

Be it known that I, CHARLES H. SMITH, a citizen of the United States, residing at Marseilles, in the county of Lasalle and State of Illinois, have invented certain new and useful Improvements in Couch-Rolls for Paper-Making Machines, of which the following is a specification.

The object of this invention is to produce a couch-roll for paper-making machines, having a resilient or yielding periphery and means for adjusting the degree of resiliency.

The accompanying drawing is a fragmental elevation, with parts in section, of a couch-roll embodying my invention.

The embodiment selected for illustration comprises a core 1 on which a pneumatic tube 2 is spirally wound. As herein shown, the core 1 is made up of sections 1ª of suitable length and diameter, said sections being mounted upon a shaft 3 and the sections being clamped together by suitable means, such as nuts 4 turned on screw-threaded portions of the shaft. The core-sections 1ª, in this instance, are fixed to the shaft 3, as by means of a key 5.

The pneumatic tube 2, in the present embodiment, consists of an outer casing 6 which may be substantially square in cross-section, said casing containing an inner tube 7. As herein shown, the tube 2 is secured to the core 1 by means of an undercut rib 8 extending longitudinally of the casing 6 and adapted to fit in a correspondingly-shaped spiral groove 9 in the periphery of the core 1. The tube 2 is arranged to lie with its coils in contact with each other so as to present an unbroken outer or peripheral surface. In order to permit of inserting the inner tube 7 into the casing 6, said casing is split upon its inner or under side, as indicated at 10. At one or both ends of the tube 7 is a valve 11 to permit of inflating the tube.

A jacket or cylindrical cover 12 of soft rubber or other suitable material may be placed over the roll formed by the core 1 and the tube 2, said cover being held in place by the expansive pressure of said tube.

I would have it understood that the invention is not limited to the details herein shown and described, for various modifications will occur to persons skilled in the art.

I claim as my invention:

1. A couch-roll for paper-making machines comprising a core having a pneumatic tube wound thereon.

2. A couch-roll for paper-making machines comprising a core, a pneumatic tube wound spirally thereon, and an undercut rib-and-groove connection between said core and said tube.

3. A couch-roll for paper-making machines comprising a core having an undercut spiral groove formed in its periphery, and a pneumatic tube having an undercut rib on its inner side to lie in said groove.

4. A couch-roll for paper-making machines comprising a core having an undercut spiral groove formed in its periphery, a tube casing having an undercut rib on its inner side to lie in said groove, said casing being split longitudinally of its inner side, and an inner tube within said tube casing.

5. A couch-roll for paper-making machines comprising a core and a pneumatic tube of square cross-section spirally wound upon and secured to said core with its coils in contact with one another.

6. A couch-roll for paper-making machines comprising a core, a pneumatic tube spirally wound upon said core, and a resilient jacket inclosing said tube.

CHARLES H. SMITH.

Witnesses:
    B. F. TUMMEL,
    C. C. PARR.